United States Patent
Randell

(10) Patent No.: US 8,144,866 B2
(45) Date of Patent: *Mar. 27, 2012

(54) METHOD AND SYSTEM FOR SECURING DATA UTILIZING REDUNDANT SECURE KEY STORAGE

(75) Inventor: Jerrold R. Randell, Waterloo (CA)

(73) Assignee: Research In Motion Limited, Waterloo (CA)

( * ) Notice: Subject to any disclaimer, the term of this patent is extended or adjusted under 35 U.S.C. 154(b) by 49 days.

This patent is subject to a terminal disclaimer.

(21) Appl. No.: 12/693,177

(22) Filed: Jan. 25, 2010

(65) Prior Publication Data

US 2010/0119065 A1     May 13, 2010

Related U.S. Application Data

(63) Continuation of application No. 11/098,497, filed on Apr. 5, 2005, now Pat. No. 7,653,202.

(60) Provisional application No. 60/579,458, filed on Jun. 14, 2004.

(51) Int. Cl.
*H04L 9/14* (2006.01)

(52) U.S. Cl. ............ 380/44; 380/46; 380/286; 713/161; 713/193

(58) Field of Classification Search .................. None
See application file for complete search history.

(56) References Cited

U.S. PATENT DOCUMENTS

| | | | |
|---|---|---|---|
| 4,926,475 A | 5/1990 | Spiotta et al. | |
| 4,941,176 A | 7/1990 | Matyas et al. | |
| 5,081,676 A | 1/1992 | Chou et al. | |
| 5,081,677 A | 1/1992 | Green et al. | |
| 5,341,426 A | 8/1994 | Barney et al. | |
| 5,495,533 A | 2/1996 | Linehan et al. | |
| 5,542,064 A | 7/1996 | Tanaka et al. | |
| 6,084,968 A * | 7/2000 | Kennedy et al. | 380/259 |
| 6,393,539 B1 | 5/2002 | Nguyen et al. | |

(Continued)

FOREIGN PATENT DOCUMENTS

EP     0226205 A2     6/1987

(Continued)

OTHER PUBLICATIONS

International Search Report for PCT/CA2005/000494, mailed on Aug. 2, 2005.

(Continued)

*Primary Examiner* — Minh Dinh
*Assistant Examiner* — Venkat Perungavoor
(74) *Attorney, Agent, or Firm* — Jenna L. Wilson; Dimock Stratton LLP

(57) ABSTRACT

A system and method which protects a data processing system against encryption key errors by providing redundant encryption keys stored in different locations, and providing the software with the ability to select an alternate redundant key if there is any possibility that the encryption key being used may be corrupted. In the preferred embodiment, a memory control module in the data processing device is configured to accommodate the storage of multiple (for example up to four or more) independent password/key pairs, and the control module duplicates a password key at the time of creation. The redundant passwords and encryption keys are forced into different memory slots for later retrieval if necessary. The probability of redundant keys being corrupted simultaneously is infinitesimal, so the system and method of the invention ensures that there is always an uncorrupted encryption key available.

14 Claims, 26 Drawing Sheets

U.S. PATENT DOCUMENTS

| | | |
|---|---|---|
| 6,393,569 B1 | 5/2002 | Orenshteyn |
| 7,178,030 B2 * | 2/2007 | Scheidt et al. ............... 713/176 |
| 2002/0007415 A1 | 1/2002 | Douglis et al. |
| 2002/0038296 A1 | 3/2002 | Margolus et al. |
| 2002/0071567 A1 | 6/2002 | Kurn et al. |
| 2003/0033537 A1 | 2/2003 | Fujimoto et al. |
| 2003/0118188 A1 | 6/2003 | Collier et al. |
| 2003/0185391 A1 * | 10/2003 | Qi et al. ..................... 380/44 |
| 2003/0188153 A1 | 10/2003 | Demoff et al. |
| 2004/0005061 A1 * | 1/2004 | Buer et al. .................. 380/282 |
| 2004/0075687 A1 | 4/2004 | Oshiro et al. |
| 2004/0228493 A1 | 11/2004 | Ma |
| 2004/0236958 A1 | 11/2004 | Teicher et al. |
| 2009/0262926 A1 * | 10/2009 | Kabra et al. .................. 380/44 |

FOREIGN PATENT DOCUMENTS

| | | |
|---|---|---|
| JP | 2003333027 A2 | 11/2003 |
| WO | 02/06948 A1 | 1/2002 |

OTHER PUBLICATIONS

European Supplementary Search Report for EP05732203.4, dated May 25, 2007.

* cited by examiner

| Address Offset (1)<br>MCU_ADDR[7:0] | NAME | Contents |
| --- | --- | --- |
| 0 x 00 | AES_PLAIN | Plaintext Register Field |
| 0 x 10 | AES_CIPHER | Ciphertext Register Field |
| 0 x 20 | AES_KEY_PM | Key Peripheral Register Field |
| 0 x 30 | AES_MANUAL | Manual Launch Register |
| 0 x 32 | AES_STATUS | Status Register |
| 0 x 34 | AES_CR | Control Register |

FIG.5

AES Plaintext Register Field

AES_PLAIN

| MCU_ADDR OFFSET | REG Mnemonic | REG Bits (D[15:0]) | Reset State |
| --- | --- | --- | --- |
| 0xE | AES_PLAIN7 | AES_PLAIN[127:112] | 0x0000 |
| 0xC | AES_PLAIN6 | AES_PLAIN[111:96] | 0x0000 |
| 0xA | AES_PLAIN5 | AES_PLAIN[95:80] | 0x0000 |
| 0x8 | AES_PLAIN4 | AES_PLAIN[79:64] | 0x0000 |
| 0x6 | AES_PLAIN3 | AES_PLAIN[63:48] | 0x0000 |
| 0x4 | AES_PLAIN2 | AES_PLAIN[47:32] | 0x0000 |
| 0x2 | AES_PLAIN1 | AES_PLAIN[31:16] | 0x0000 |
| 0x0 | AES_PLAIN0 | AES_PLAIN[15:0] | 0x0000 |

| Bit Mnemonic | Function |
| --- | --- |
| AES_PLAIN[127:0] | Plain Text Register |

FIG.6

AES Ciphertext Register Field

AES_CIPHER

| MCU_ADDR OFFSET | REG Mnemonic | REG Bits (D[15:0]) | Reset State |
|---|---|---|---|
| 0xE | AES_CIPHER7 | AES_CIPHER[127:112] | 0x0000 |
| 0xC | AES_CIPHER6 | AES_CIPHER[111:96] | 0x0000 |
| 0xA | AES_CIPHER5 | AES_CIPHER[95:80] | 0x0000 |
| 0x8 | AES_CIPHER4 | AES_CIPHER[79:64] | 0x0000 |
| 0x6 | AES_CIPHER3 | AES_CIPHER[63:48] | 0x0000 |
| 0x4 | AES_CIPHER2 | AES_CIPHER[47:32] | 0x0000 |
| 0x2 | AES_CIPHER1 | AES_CIPHER[31:16] | 0x0000 |
| 0x0 | AES_CIPHER0 | AES_CIPHER[15:0] | 0x0000 |

| Bit Mnemonic | Function |
|---|---|
| AES_CIPHER[127:0] | Cipher Text Register |

FIG.7

AES Key Peripheral Register Field

AES_KEY_PM

| MCU_ADDR OFFSET | REG Mnemonic | REG Bits (D[15:0]) | Reset State |
|---|---|---|---|
| 0xE | AES_KEY_PM7 | AES_KEY_PM[127:112] | 0x0000 |
| 0xC | AES_KEY_PM6 | AES_KEY_PM[111:96] | 0x0000 |
| 0xA | AES_KEY_PM5 | AES_KEY_PM[95:80] | 0x0000 |
| 0x8 | AES_KEY_PM4 | AES_KEY_PM[79:64] | 0x0000 |
| 0x6 | AES_KEY_PM3 | AES_KEY_PM[63:48] | 0x0000 |
| 0x4 | AES_KEY_PM2 | AES_KEY_PM[47:32] | 0x0000 |
| 0x2 | AES_KEY_PM1 | AES_KEY_PM[31:16] | 0x0000 |
| 0xE | AES_KEY_PM0 | AES_KEY_PM[15:0] | 0x0000 |

| Bit Mnemonic | Function |
|---|---|
| AES_KEY_PM[127:0] | Key Peripheral Register |

FIG.8

AES Manual Register

AES_MANUAL  
Read/Write  
Reset State: 0x0000  
Access: 16 bit

| 15 | 14 | 13 | 12 | 11 | 10 | 9 | 8 |
|----|----|----|----|----|----|----|----|
| NA | | | | | | | |

| 7 | 6 | 5 | 4 | 3 | 2 | 1 | 0 |
|---|---|---|---|---|---|---|---|
| NA | | | | | | | |

| Bit # | Bit Mnemonic | Function |
|-------|--------------|----------|
| 15:0 | NA | (R) '0000 0000 0000 0000'<br>(W) Any write to this register launches a peripheral operation when in manual mode. Manual mode is configured in AES_CR |

FIG.9

AES Status Register

AES_STATUS  
Read  
Reset State: 0x0000  
Access: 16 bit

| 15 | 14 | 13 | 12 | 11 | 10 | 9 | 8 |
|----|----|----|----|----|----|----|----|
| NA | | | | | | | |

| 7 | 6 | 5 | 4 | 3 | 2 | 1 | 0 |
|---|---|---|---|---|---|---|---|
| NA | | | | | PERI_DONE | PERI_UNDER WAY | LAUNCH_PERI_PENDING |

| Bit # | Bit Mnemonic | Function |
|-------|--------------|----------|
| 15:3 | NA | (RO) '0000 0000 0000 0' |
| 2 | PERI_DONE | '0' - The peripheral operation is in progress<br>'1' - The peripheral operation is complete |
| 1 | PERI_UNDERWAY | '0' - A peripheral operation is not in progress<br>'1' - A peripheral operation is in progress |
| 0 | LAUNCH_PERI_PENDING | '0' - A peripheral operation will not launch after datapath operation in progress<br>'1' - A peripheral operation will launch after datapath operation in progress |

FIG.10

AES Control Register
AES_CR
Read/Write

Reset State: 0x0000
Access: 16 bit

| 15 | 14 | 13 | 12 | 11 | 10 | 9 | 8 |
|----|----|----|----|----|----|---|---|
| NA ||||||||

| 7 | 6 | 5 | 4 | 3 | 2 | 1 | 0 |
|---|---|---|---|---|---|---|---|
| NA |||| PERI_EN | D_NOT_E | LE_NOT_BE | MANUAL |

| Bit # | Bit Mnemonic | Function |
|-------|--------------|----------|
| 15:4 | NA | (RO) '0000 0000 0000' |
| 3 | PERI_EN | '0' - AES controls gated clock<br>'1' - Gated clock is enabled |
| 2 | D_NOT_E | Peripheral mode direction<br>'0' - decryption<br>'1' - encryption |
| 1 | LE_NOT_BE | peripheral mode data format<br>'0' - ???????<br>'1' - little endian halfword |
| 0 | MANUAL | Launch Mode<br>'0' - auto peripheral operation launch mode<br>'1' - manual launch mode. Writing anything to AES_MANUAL launches a peripheral operation. |

FIG.11

| Address Offset MCU_ADDR[5:0] | NAME | Contents |
|---|---|---|
| 0 x 00 | SEC-CTRL | Control Register |
| 0 x 10 | SEC-STAT | Status Register |
| 0 x 20 | SEC-VER_CTRL | Version Control Register |
| 0 x 30 | SEC-PW | Password Register Field |
| 0 x 32 | SEC-KS | Key Seed Register Field |

FIG.15

SEC Control Register

SEC-CTRL  
Read/Write  
Reset State: 0x0000  
Access: 16 bit

| 15 | 14 | 13 | 12 | 11 | 10 | 9 | 8 |
|----|----|----|----|----|----|---|---|
| NA | | | | | | | |

| 7 | 6 | 5 | 4 | 3 | 2 | 1 | 0 |
|---|---|---|---|---|---|---|---|
| FAST_IF | CLEAR_SDRAM | DIS_ENCRYPT | KEY_SELECT[1:0] | | CMD[2:0] | | |

| Bit # | Bit Mnemonic | Function |
|-------|--------------|----------|
| 15:8 | NA | (RO) '0000 0000' |
| 7 | FAST_IF | Fast Interface (R/W)<br><br>0 : Normal (EEPROM clock speed = sys_clk/1024)<br>1 : Fast (EEPROM clock speed = sys_clk/8)<br><br>Fast mode is provided for debug/test purposes only. EEPROM operation is not characterized at this speed. |
| 6 | CLEAR_SDRAM | Clear SDRAM (R/W)<br><br>0 : CLEAR_SDRAM signal to SIC is controlled by state machine<br>1 : CLEAR_SDRAM signal to SIC is asserted |
| 5 | DIS_ENCRYPT | Disable Encryption (R/W*)<br><br>0 : Encryption and decryption is performed as per the current state.<br>1 : Encryption and decryption is bypassed.<br><br>This bit is only writeable when accessed from the processor interface |
| 4:3 | KEY_SELECT[1:0] | Key Select (R/W)<br><br>00 : Password and Key set 0<br>01 : Password and Key set 1<br>10 : Password and Key set 2<br>11 : Password and Key set 3 |
| 2:0 | CMD[2:0] | Key Command (R/W)<br><br>000 : GET_KEY<br>001 : COMPARE<br>010 : ADD_KEY<br>011 : REMOVE_KEY<br>100 : CHANGE_KEY<br>101 : UPDATE_KEY<br>110 : ENTER_DEBUG<br>111 : EXIT_DEBUG |

FIG.16A

| Bit # | Bit Mnemonic | Function |
|---|---|---|
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG.16B

SEC Status Register

SEC-STAT  
Read/Write

Reset State: 0x0000  
Access: 16 bit

| 15 | 14 | 13 | 12 | 11 | 10 | 9 | 8 |
|---|---|---|---|---|---|---|---|
| CMD_BUSY | EEPROM_BUSY | EEPROM_ERROR | NA | | | | SDRAM_CLEAR |

| 7 | 6 | 5 | 4 | 3 | 2 | 1 | 0 |
|---|---|---|---|---|---|---|---|
| KEY_STAT[1:0] | | PW_STAT[1:0] | | MODE[3:0] | | | |

| Bit # | Bit Mnemonic | Function |
|---|---|---|
| 15 | CMD_BUSY | Command Busy (RO)<br>0 : not busy<br>1 : busy<br>This bit will be cleared when the current command has completed. |
| 14 | EEPROM_BUSY | EEPROM Busy (RO)<br>0 : not busy<br>1 : busy, eeprom device address was not acknowledged during Get_Key<br>This bit will be cleared upon writing to this register |
| 13 | EEPROM_ERROR | EEPROM Error (R/O)<br>0 : no error<br>1 : error, eeprom word address, or write data was not acknowledged or device address was not acknowledged after a 15 ms time out<br>This bit will be cleared upon writing to this register |
| 12:9 | NA | (RO) '0 0000' |
| 8 | SDRAM_CLEAR | SDRAM_CLEAR (R/O)<br>0 : SDRAM_CLEARED was not asserted<br>1 : SDRAM_CLEARED was asserted<br>This bit will be cleared upon writing to this register |
| 7:6 | KEY_STAT | Key Compare Status<br>00 : no result<br>01 : Key Match<br>10 : Key Mismatch, or no old key had been loaded<br>11 : Comparison being made |
| 5:4 | PW_STAT | Password Compare Status (R/O)<br>00 : no result, password cleared<br>01 : Password Valid<br>10 : Password Invalid<br>11 : Comparison being made |

FIG.17A

| Bit # | Bit Mnemonic | Function |
| --- | --- | --- |
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG.17B

SEC Password Register Field

SEC-PW

| MCU_ADDR OFFSET | REG Mnemonic | REG Bits (D[15:0]) | Reset State |
|---|---|---|---|
| 0xE | SEC-PW7 | PW[127:112] | 0x0000 |
| 0xC | SEC-PW6 | PW[111:96] | 0x0000 |
| 0xA | SEC-PW5 | PW[95:80] | 0x0000 |
| 0x8 | SEC-PW4 | PW[79:64] | 0x0000 |
| 0x6 | SEC-PW3 | PW[63:48] | 0x0000 |
| 0x4 | SEC-PW2 | PW[47:32] | 0x0000 |
| 0x2 | SEC-PW1 | PW[31:16] | 0x0000 |
| 0x0 | SEC-PW0 | PW[15:0] | 0x0000 |

| Bit Mnemonic | Function |
|---|---|
| PW[127:0] | Password (W only)<br>This field contains the password that is used for comparision purposes, and for the password that is linked with a new encryption keys.<br><br>The full password must be entered while in Key_Loaded, Secure, or the Validated states in order to execute the ADD_KEY, REMOVE_KEY, CHANGE_KEY, or COMPARE commands. Otherwise, transition from those states is prohibited. |

FIG.18

SEC Key Seed Register Field

SEC-KS

| MCU_ADDR OFFSET | REG Mnemonic | REG Bits (D[15:0]) | Reset State |
|---|---|---|---|
| 0xE | SEC-KS7 | KS[127:112] | 0x0000 |
| 0xC | SEC-KS6 | KS[111:96] | 0x0000 |
| 0xA | SEC-KS5 | KS[95:80] | 0x0000 |
| 0x8 | SEC-KS4 | KS[79:64] | 0x0000 |
| 0x6 | SEC-KS3 | KS[63:48] | 0x0000 |
| 0x4 | SEC-KS2 | KS[47:32] | 0x0000 |
| 0x2 | SEC-KS1 | KS[31:16] | 0x0000 |
| 0x0 | SEC-KS0 | KS[15:0] | 0x0000 |

| Bit Mnemonic | Function |
|---|---|
| SEC-KS[127:0] | Key Seed (W only) This field contains the key seed which XOR with the current key and current password to obtain a new key. |

FIG.19

METHOD AND SYSTEM FOR SECURING DATA UTILIZING REDUNDANT SECURE KEY STORAGE

REFERENCE TO PRIOR APPLICATIONS

This application is a continuation of U.S. patent application Ser. No. 11/098,497, filed Apr. 5, 2005, which claims priority from U.S. patent application No. 60/579,458, filed Jun. 14, 2004.

FIELD OF INVENTION

This invention relates to data processing systems. In particular, this invention relates to an encryption system in a data processing device.

BACKGROUND OF THE INVENTION

The use of portable data processing systems has increased significantly in recent years. In addition to so called "laptop" and "tablet" computers, there is a growing popularity in handheld data processing devices, often called a "personal digital assistant" or "PDA." All of these devices are capable of storing a significant amount of user data, including calendar, address book, tasks and numerous other types of data for business and personal use. Most handheld data processing devices have the ability to connect to a personal computer for data exchange, and many are equipped for wireless communications using, for example, conventional email messaging systems. Depending upon the user's needs much of this data can be highly sensitive in nature, especially in a government, military or commercial context.

Portable data processing systems are typically password protected. However, in the hands of a technically sophisticated individual with malicious intent, there are ways to obtain the data stored in memory in such a device if the data is not encrypted. Accordingly the data stored in persistent memory is typically encrypted using an encryption key. This requires that the same encryption key used to encrypt the data be used to decrypt the data.

In any data storage systems there is a possibility that over time, or because of an event, a portion of the memory will fail. The failure may reveal itself as a single bit error, multiple word errors, or possibly a complete memory failure. When the memory is used to store an encryption key, even a single bit error can corrupt the key sufficiently to render it useless. Should this occur, then the entire volume of data encrypted with the corrupted key becomes undecryptable, and as a result is lost. To prevent this data loss, an uncorrupted encryption key must be available at all times.

SUMMARY OF THE INVENTION

The invention provides a system and method which protects a data processing system against encryption key errors. According to the invention, this is accomplished by providing redundant encryption keys stored in different locations, and providing the software with the ability to select an alternate redundant key if there is any possibility that the encryption key being used may be corrupted.

In the preferred embodiment, a memory control module in the data processing device is configured to accommodate the storage of multiple (for example up to four or more) independent password/key pairs. When so configured, the control module will duplicate a password key at the time of creation by repeating the ADD_KEY command using the same CURRENT_KEY, KEY_SEED (a random arrangement of bits stored in hardware) and PASSWORD sources. The redundant passwords and encryption keys are forced into different memory slots for later retrieval if necessary.

The probability of redundant keys being corrupted simultaneously is infinitesimal. The system and method of the invention thus ensures that there is always an uncorrupted encryption key available.

The present invention thus provides a method of securing data in a data processing device having an encryption device for encrypting and decrypting data using an encryption key-password pair, comprising the steps of: a. generating a first encryption key, b. storing the first encryption key in a first location in a memory, c. generating at least one additional encryption key, d. storing each additional encryption key in a memory in a different location from the location of each other encryption key, and e. creating a register storing the location of each encryption key, wherein to encrypt or decrypt data the first encryption key is retrieved but upon the occurrence of a particular event one of the additional encryption keys is retrieved.

The present invention further provides a data processing device comprising a system for securing data, comprising an encryption device for encrypting and decrypting data using an encryption key-password pair, at least one key generating device for generating a plurality of encryption keys, and at least one memory for storing the encryption keys in separate locations and for storing a register identifying the location of each encryption key, wherein to encrypt or decrypt data a first encryption key is retrieved but upon the occurrence of a particular event a different encryption key is retrieved.

The present invention further provides a mobile communications system, comprising a communications subsystem, for receiving and transmitting data, a processor for processing data, having a system for securing data communicated to and from the device comprising an encryption device for encrypting and decrypting data received and transmitted using an encryption key-password pair, comprising at least one key generating device for generating a plurality of encryption keys, and at least one memory for storing the encryption keys in separate locations and for storing a register identifying the location of each encryption key, wherein to encrypt or decrypt data a first encryption key is retrieved but upon the occurrence of a particular event a different encryption key is retrieved.

BRIEF DESCRIPTION OF THE DRAWINGS

In drawings which illustrate by way of example only a preferred embodiment of the system.

FIG. 5 is a Configuration Registers Map for the encryption module of FIG. 4.

FIG. 6 is an AES Plaintext Register Field table associated with the Configuration Registers Map of FIG. 5.

FIG. 7 is an AES Ciphertext Register Field table associated with the Configuration Registers Map of FIG. 5.

FIG. 8 is an AES Key Peripheral Register Field table associated with the Configuration Registers Map of FIG. 5.

FIG. 9 is an AES Manual Launch Register table associated with the Configuration Registers Map of FIG. 5.

FIG. 10 is an AES Status Register table associated with the Configuration Registers Map of FIG. 5.

FIG. 11 is an AES Control Register table associated with the Configuration Registers Map of FIG. 5.

FIG. 15 is a Configuration Registers Map for the Serial EEPROM Controller of FIG. 13.

FIGS. 16A and 16B are first and second parts of a Control Register table associated with the Configuration Registers Map of FIG. 15.

FIGS. 17A and 17B are first and second parts of a Status Register table associated with the Configuration Registers Map of FIG. 15.

FIG. 18 is a Password Register Field table associated with the Configuration Registers Map of FIG. 15.

FIG. 19 is a Key Seed Register Field table associated with the Configuration Registers Map of FIG. 15.

DETAILED DESCRIPTION OF THE INVENTION

Figure 1:
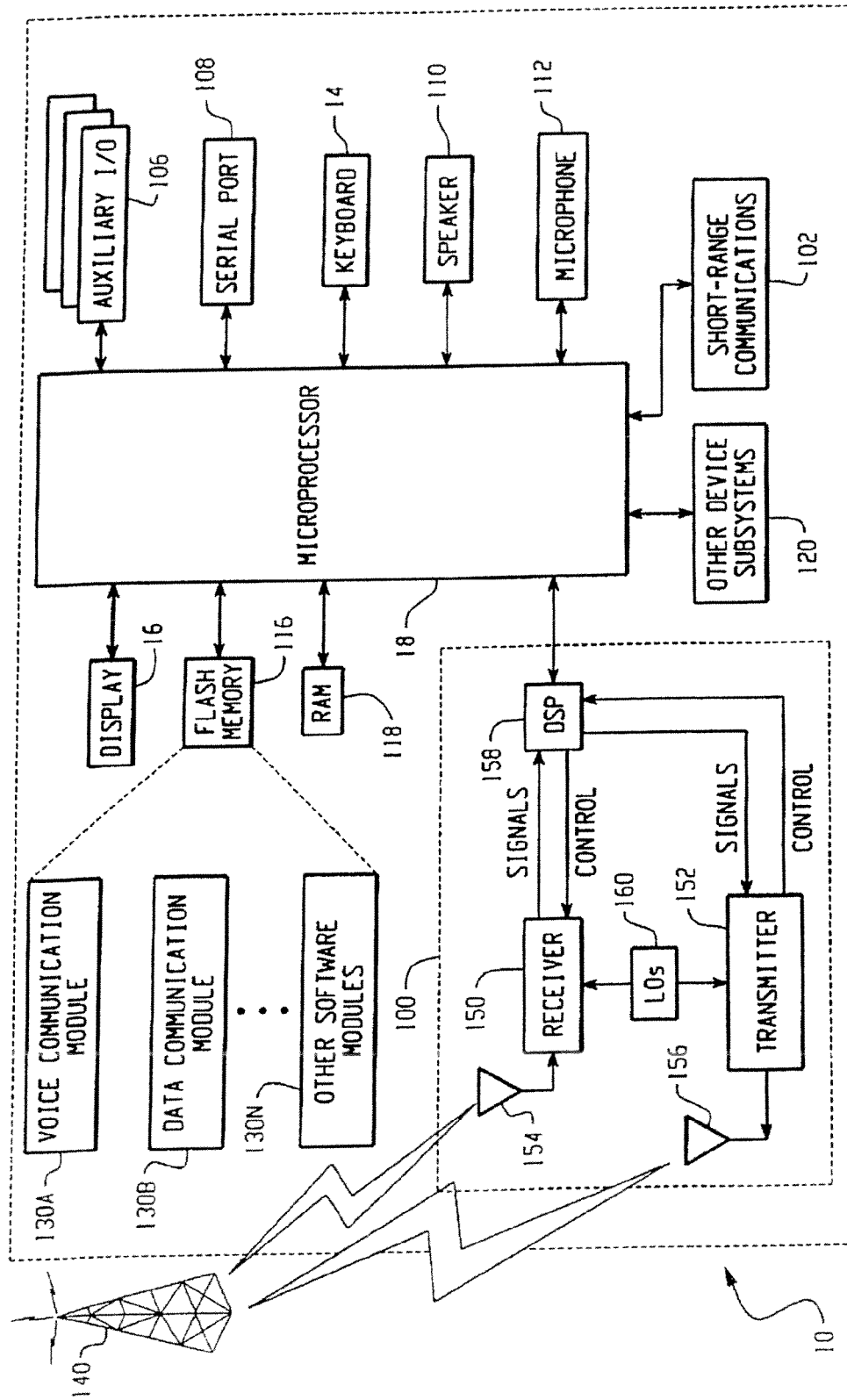
FIG. 1 is a block diagram of a system overview of a conventional mobile data processing device.
Figure 2:
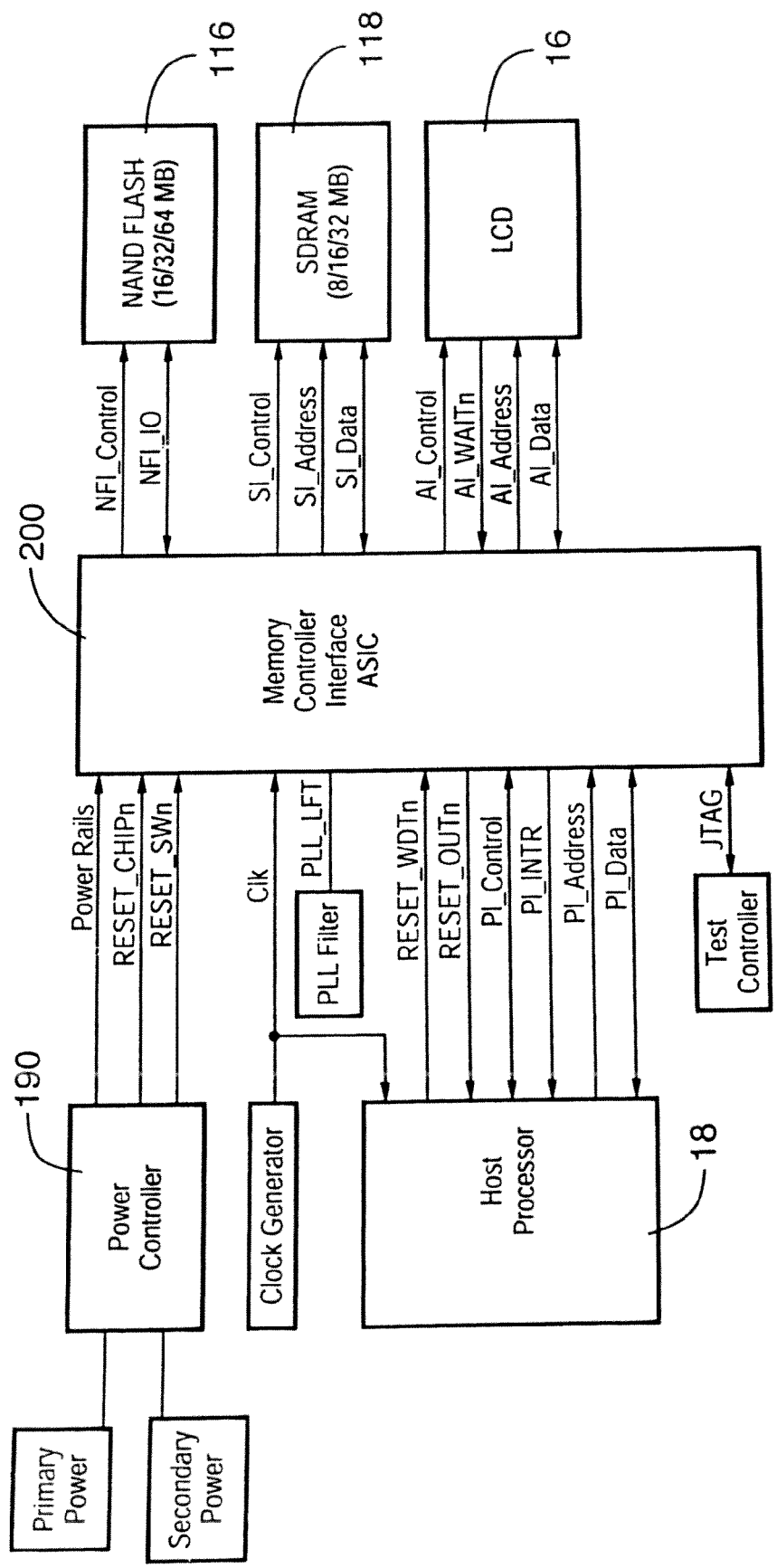
FIG. 2 is a system interface block diagram of a data processor in the data processing device of FIG. 1.
Figure 3A:
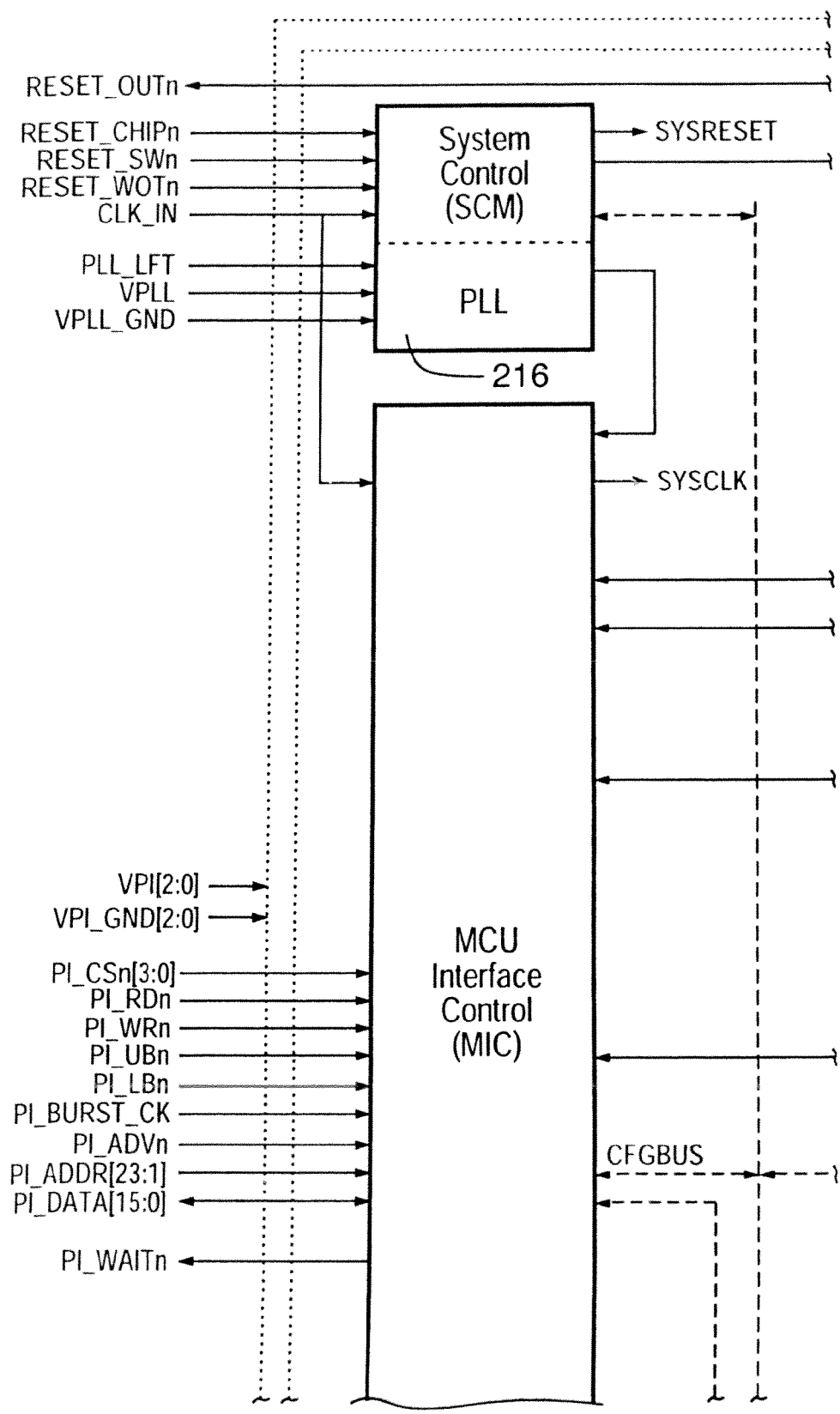
FIGS. 3A-3I is a detailed block diagram of the memory controller interface in the data processor of FIG. 2.
Figure 3B:
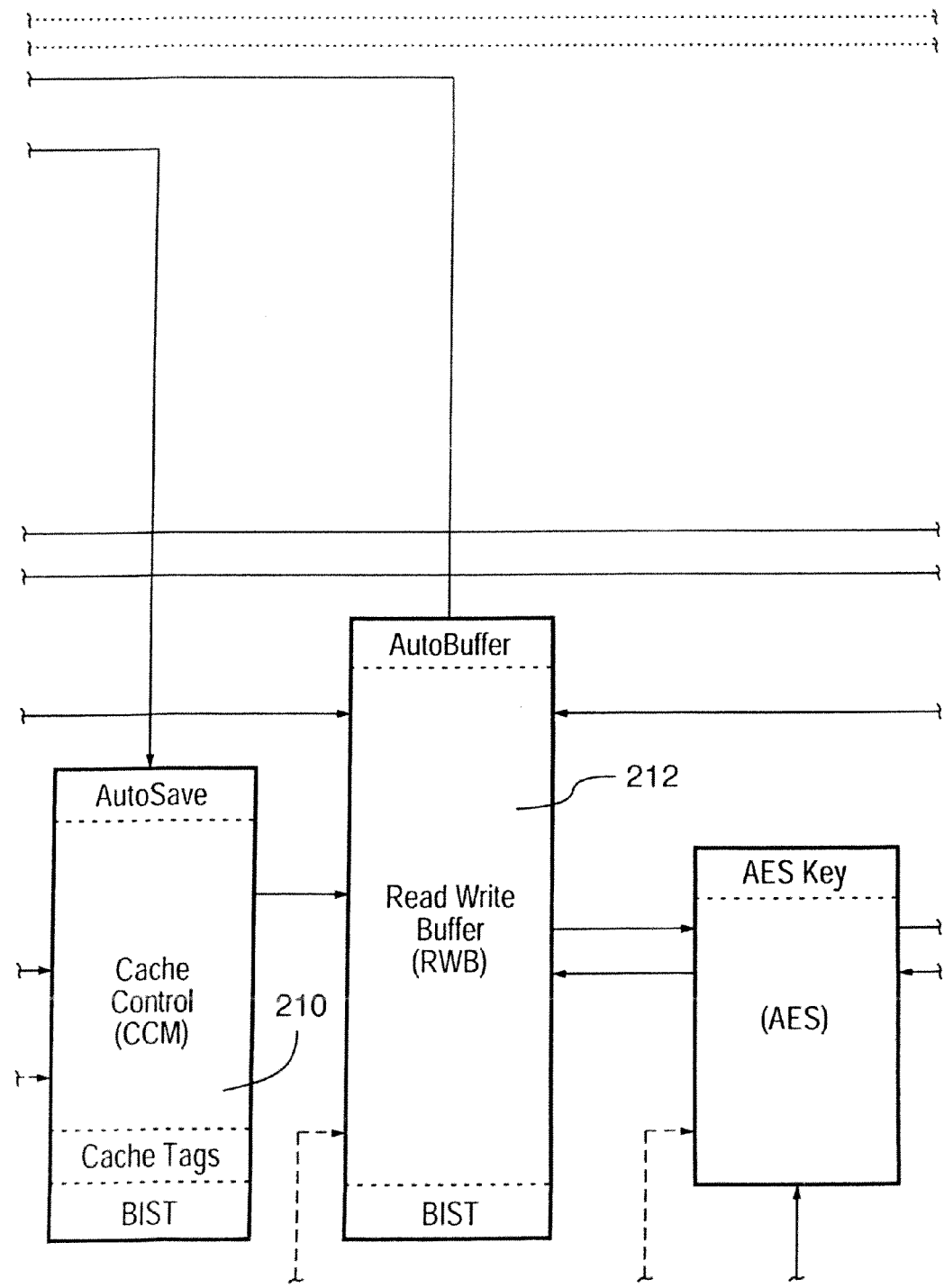
Figure 3C:
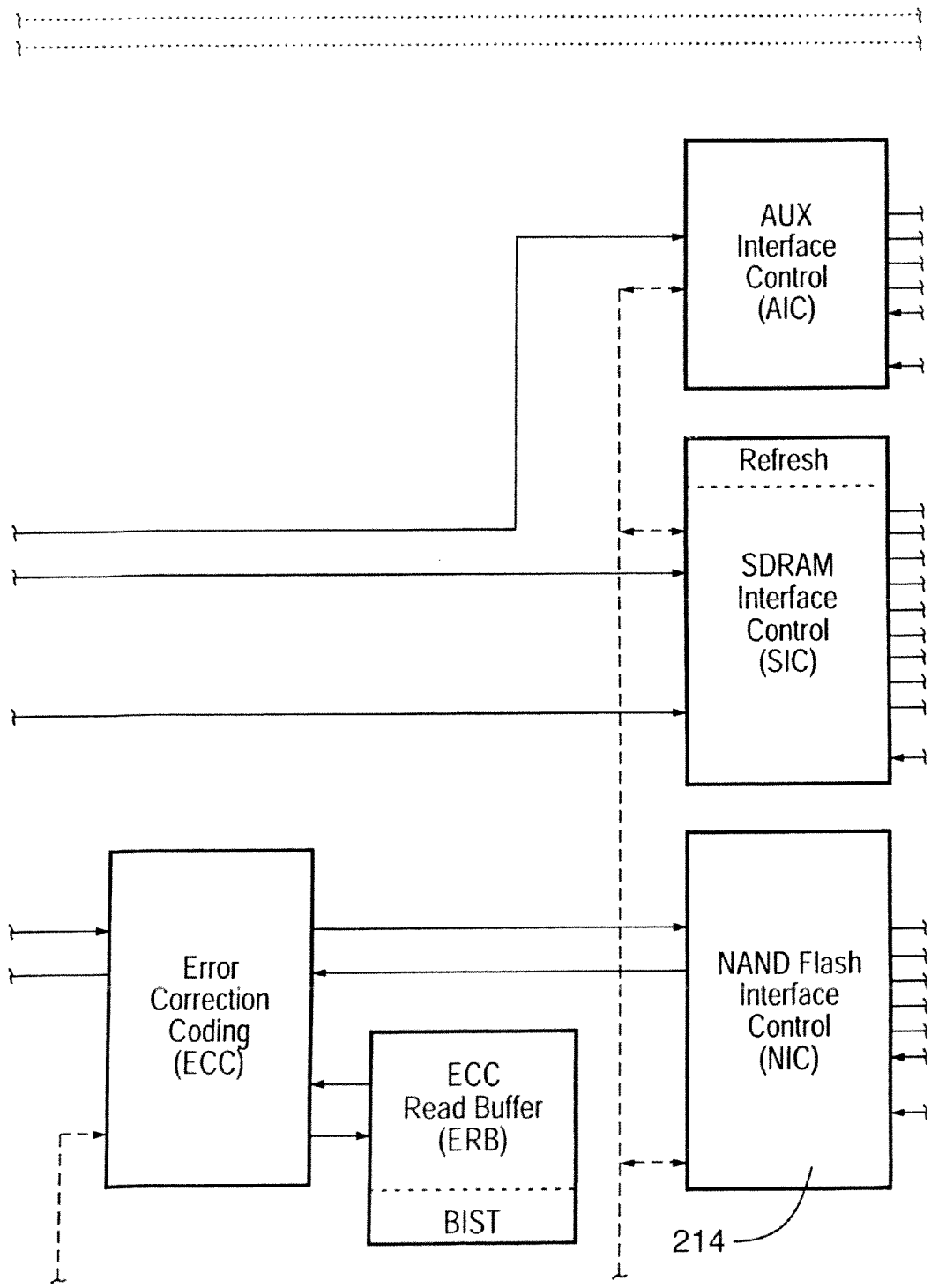
Figure 3D:
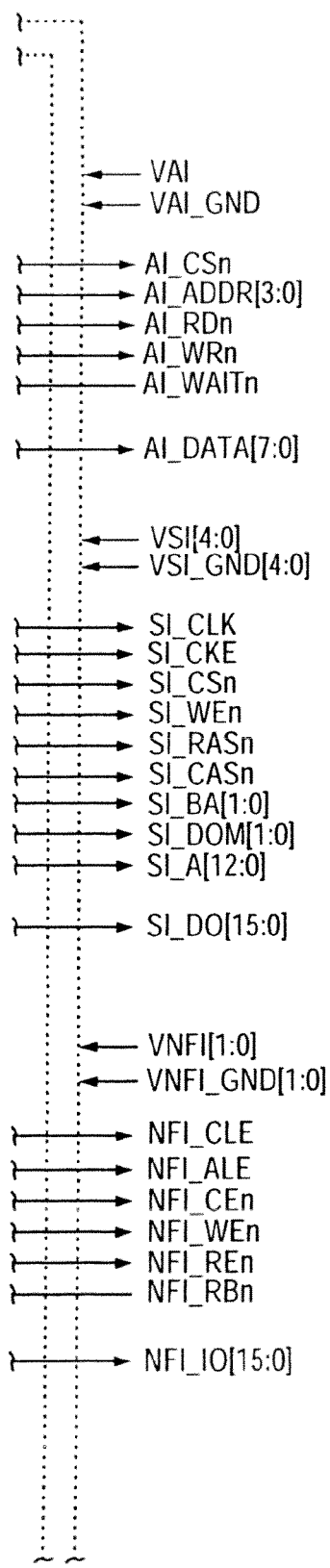
Figure 3E:
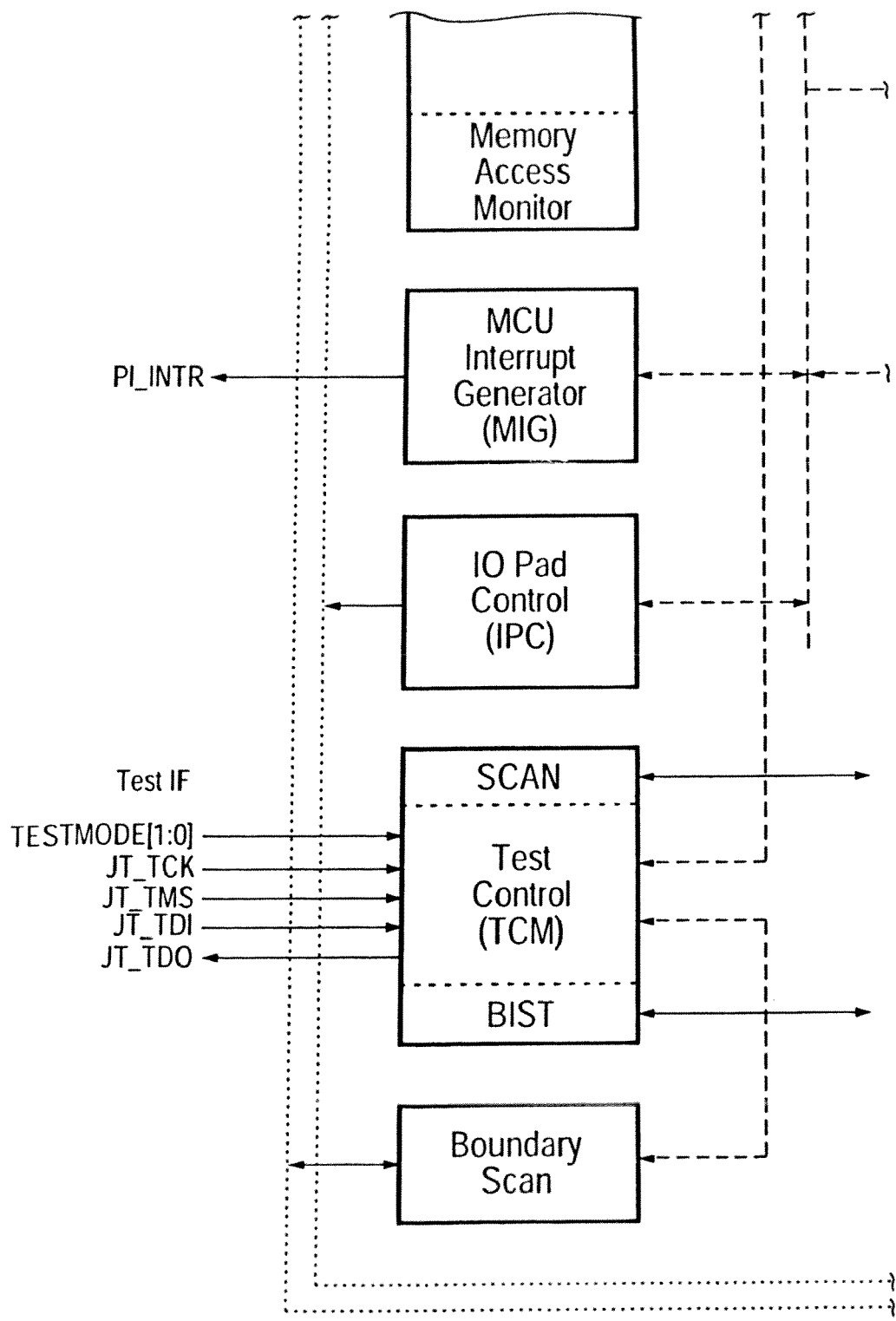
Figure 3F:
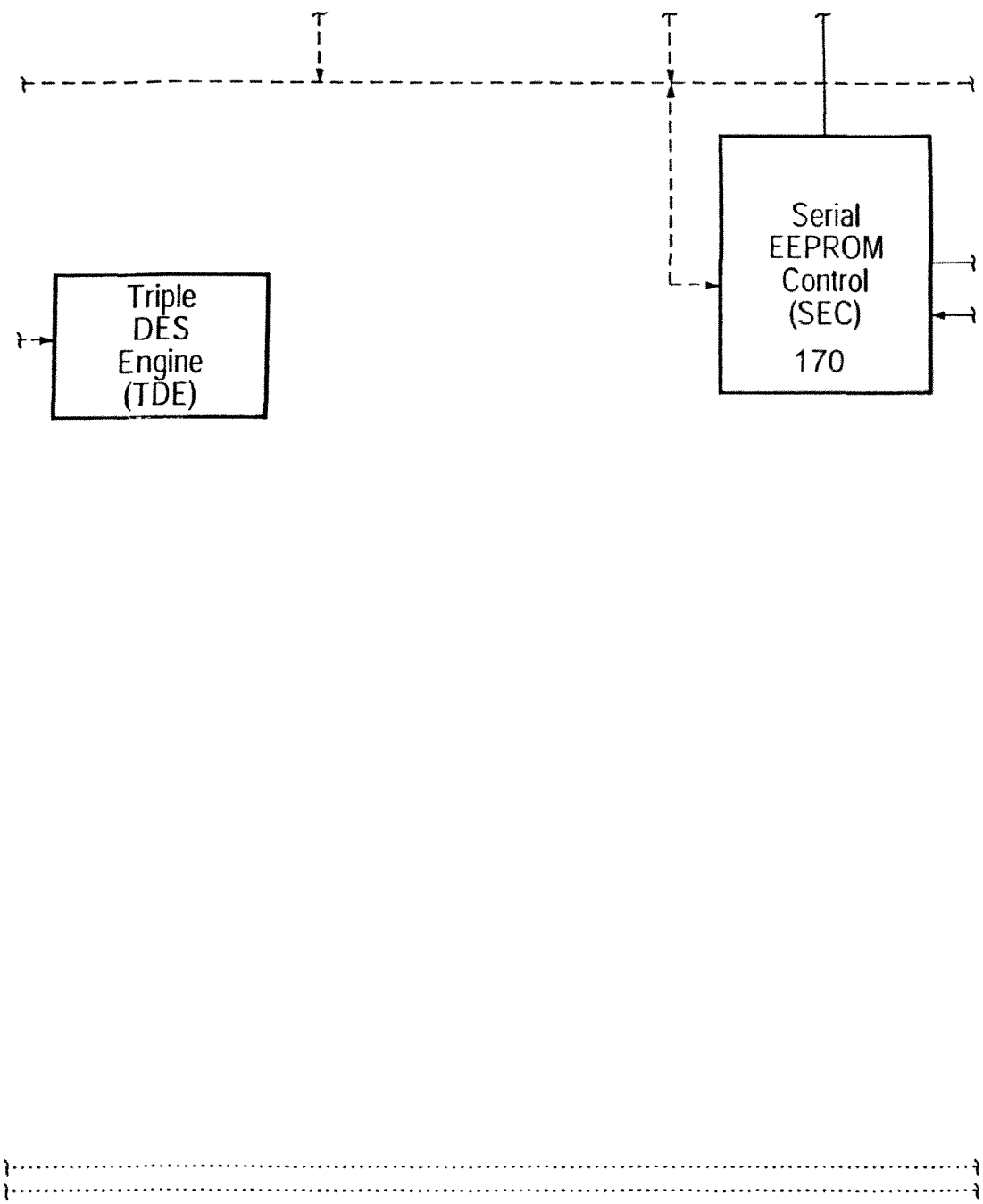
Figure 3G:
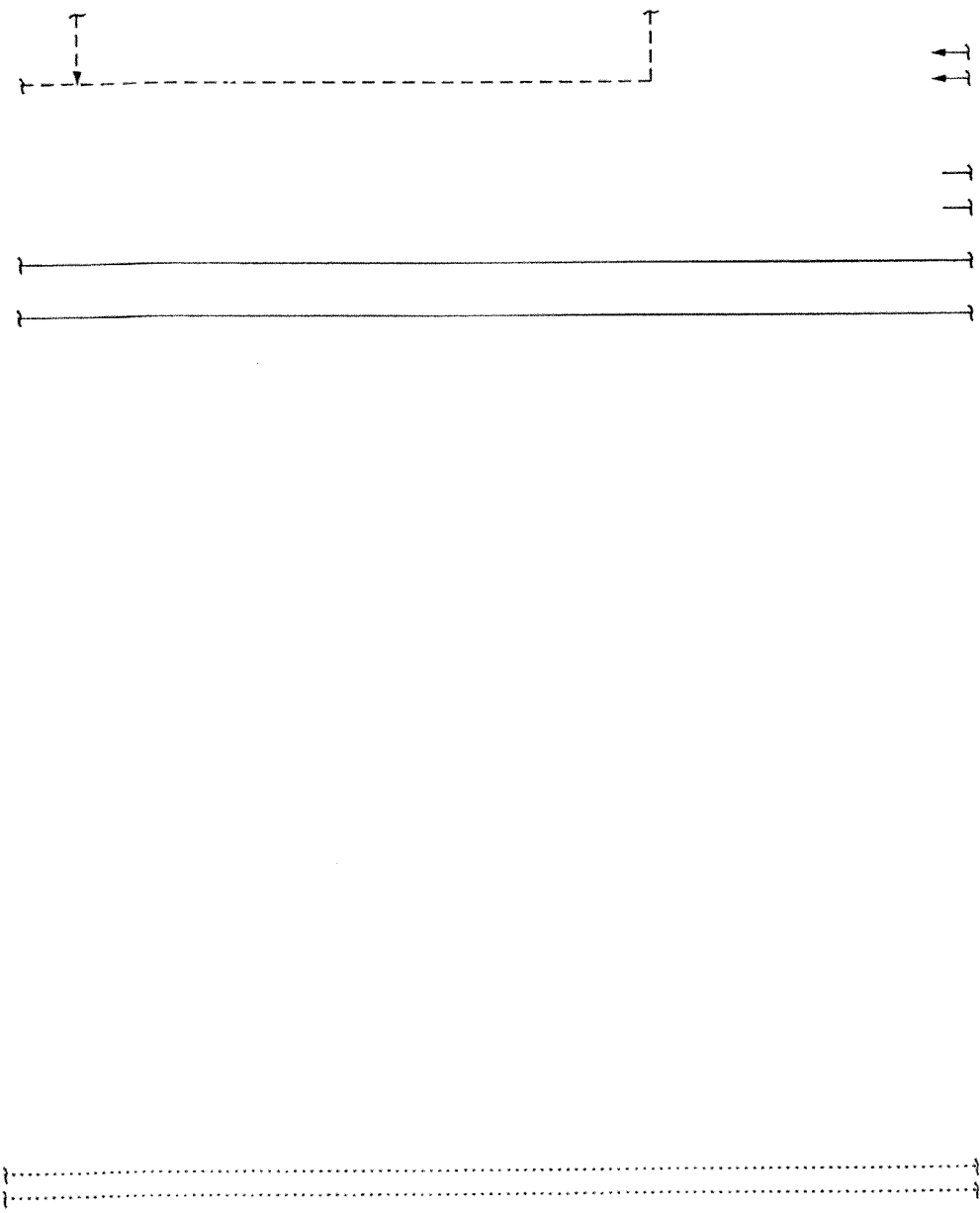
Figure 3H:
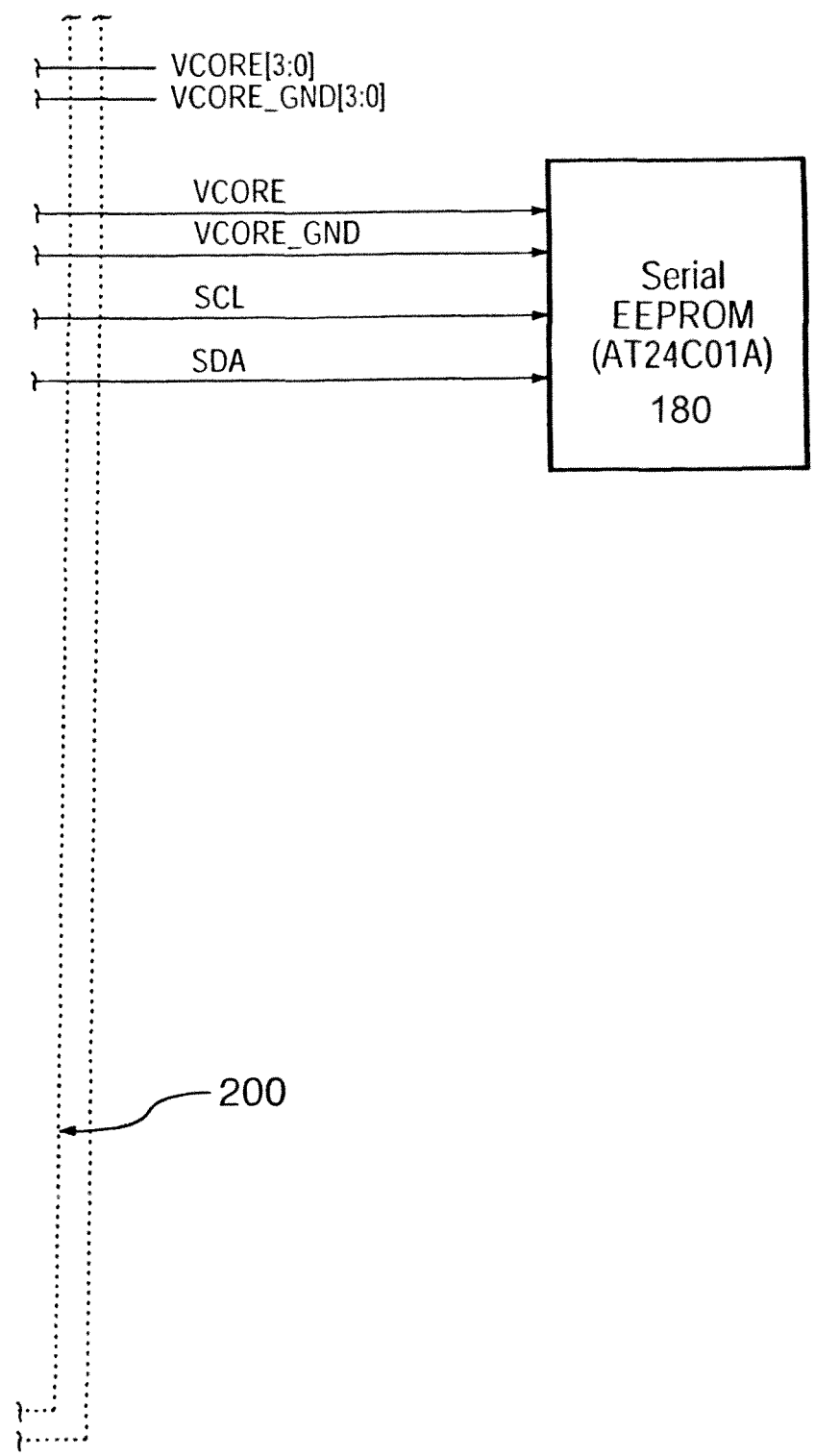
Figure 3I:
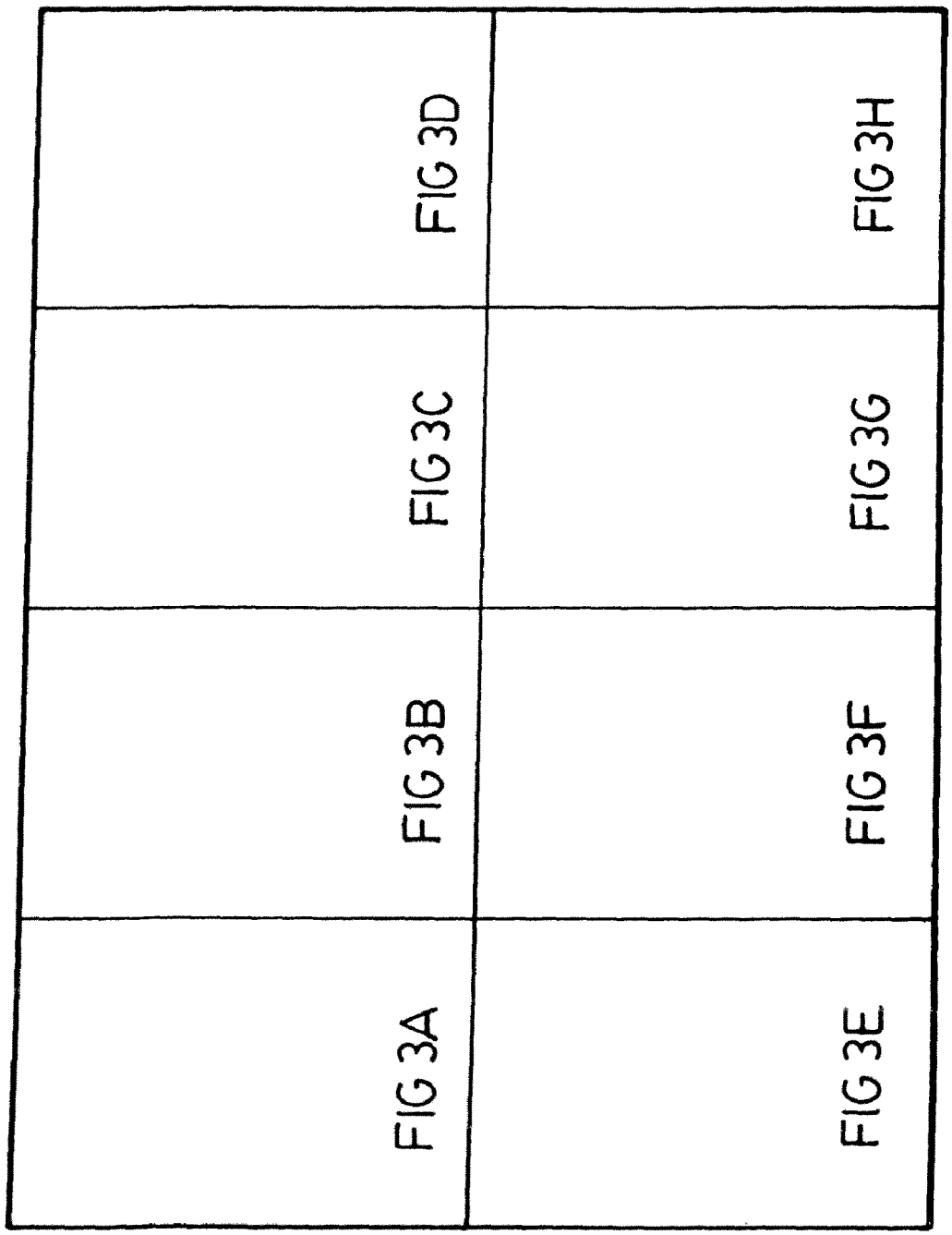

A preferred embodiment of the system will be described in detail below, by way of example only, in the context of a hand-held data processing device having wireless communications capabilities as illustrated in FIGS. 1 to 3. However, it will be appreciated that the principles apply to other data processing devices and the system is not intended to be limited thereby.

The hand-held data processing devices 10 include a housing, a keyboard 14 and an output device 16. The output device shown is a display 16, which is preferably a full graphic LCD. Other types of output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard may include a mode selection key, or other hardware or software for switching between text entry and telephony entry.

In addition to the processor 18, other parts of the mobile device 10 are shown schematically in FIG. 1. These include a communications subsystem 100; a short-range communications subsystem; the keyboard 14 and the display 16, along with other input/output devices 106, 108, 110 and 112; as well as memory devices 116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device 10. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Data stored in the non-volatile memory, in the embodiment shown NAND flash 116, is encrypted using any suitable encryption algorithm, for example Advanced Encryption Standard (AES), preferably implemented in hardware. In the preferred embodiment the first bits of the basic encryption key are selected randomly and embedded at the time of manufacture of the chip. The user is able to change the basic encryption key, and after doing so all of the encrypted data must be read out of memory, decrypted using the key existing at the time of encryption, re-encrypted with the new key, and written back into memory.

As the basic encryption key is changed, the components of the prior key(s) and prior password accumulate and form part of the new key. To further increase security, in the preferred embodiment the encryption algorithm uses the address location of the data to modify a portion of the encryption key, so that the same data will be encrypted differently when stored in different locations in memory.

In the preferred embodiment the encryption system performs a password verification before any data from memory can be decrypted. Also, in the preferred embodiment the encryption key is not derived from the password, so even a weak password will not compromise the key, and before any data from memory can be decrypted a security controller performs a password verification. It is possible to change the value of the key at anytime by transitioning through a state machine that requires successful entry of the password, and once the key is changed, all of the existing data that is encrypted with the old key must be read out using the old key and re-written using the new key.

According to the preferred embodiment of the invention, multiple address locations in the EEPROM 180 are dedicated as key slots so that the data processing device 10 can store multiple (up to four in the embodiment shown, by way of example only) independent keys. The system software may be configured (by the manufacturer, or if desired the user can be given the option to configure by toggling an enabling command) to automatically use one or more of the extra key slots, either for redundant storage of the master key, or for storing keys dedicated to the encryption and decryption of specific types of data.

Figure 4:
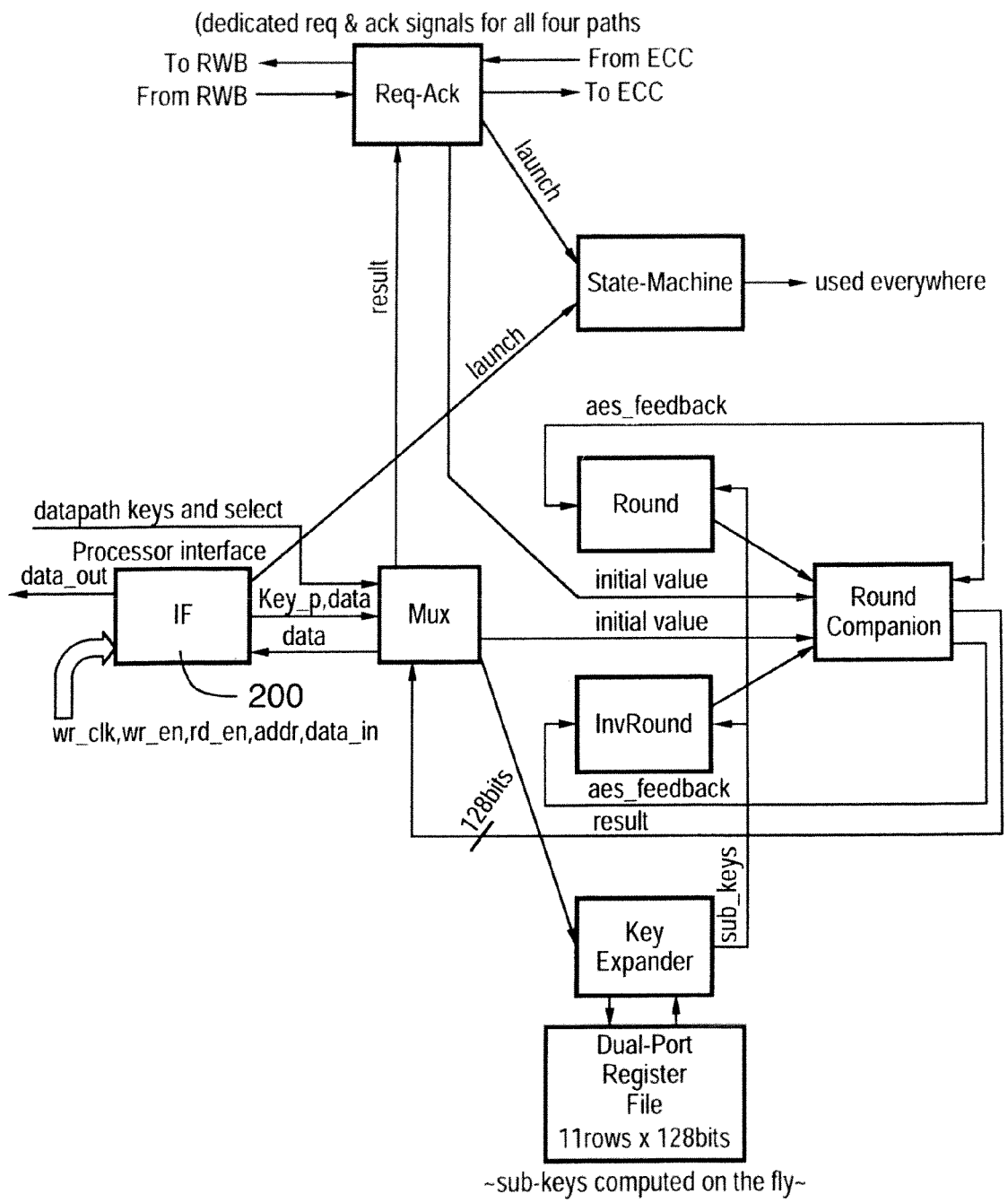
FIG. 4 is a detailed block diagram showing the implementation of the encryption and decryption algorithms effected by the AES encryption module in the data processor of FIG. 2.

The device 10 may use any available encryption methodology, a conventional AES encryption scheme being illustrated in FIG. 4 by way of example only. However, encryption could be effected by any other system, such as DES, DESX and triple-DES, and the invention is not limited to any particular encryption system. The encryption module includes interfaces with the EEPROM Control (SEC) block 170 of FIG. 13 and an interface with an Error Correction Coding (ECC) module and the Read-Write Buffer (RWB). The encryption module encrypts and decrypts in two different modes: a peripheral mode, which allows a programmer to access the encryption module through a peripheral interface and is not used during normal operation of the device 10; and a datapath mode used in normal operation of the device 10 which incorporates the encryption module in the chain of functions that bridge the SDRAM memory 118 with NAND flash 116. The datapath mode happens automatically due to a request from an upstream or downstream block. A peripheral encryption module operation cannot be interrupted by a datapath operation and vice versa. This means that a peripheral operation can be held off by a datapath operation, so a status register is provided for polling.

In datapath mode it is possible to bypass the encryption module such that the data out remains unchanged. There are two datapath keys supplied, along with bypass and select signals. The high level management of the keys occurs in the Serial EEPROM Control (SEC) block 170 illustrated in FIG. 13. The encryption module functions as a peripheral, which can be loaded with a key and plaintext, and then launched. Once the status declares the operation is done, the result can be read from the cipher register. Launch can be done automatically or manually. In the automatic case the encryption module launches once a specific data register is written, and this register can be selected in anticipation of a big or little endian processor.

Under datapath operation there are two keys to choose from when not in bypass: current key and new key. Although encryption and decryption can be done with either key, in practical terms decryption will always be done with the current key. Encryption will normally be done with the current key, but would be done with the new key during datacopy when the user wants to change over to a new key.

Communication is through a request and acknowledge protocol. The receiver in the device 10 sends a request for data, along with the address of a sector. The server acknowledges the request and provides data. Both the Ack and Req can be pulled low to stall the flow. The receiver asserts a sector frame signal until it has received all the data.

Requests to the encryption module will always be a perfect multiple of the encryption module packet size of 128 bits, and in the preferred embodiment one NAND sector, which is 512 bytes. Requests from the encryption module will always be in the encryption module packet size.

The peripheral bus, which communicates with the encryption module through processor interface 200, uses a dedicated write clock, which saves power over a scheme which just qualifies the high speed system clock. The dedicated read enable signal, and read data bus allow a simple OR of all the peripheral data return buses since they return zero when not selected.

The encryption module clock enable is set when a datapath request is in force or a peripheral operation is pending and held until the encryption module state machine has found its way back to idle. The other clock-gating domain lies with the datapath request-acknowledge handshake scheme. The acknowledge can be used to either gate the clock to a register, or qualify that clock. Whoever is sending data in response to an acknowledge has this choice. In the encryption module design the clock is qualified.

The datapath keys are supplied and managed from the Serial EEPROM Controller (SEC) block 170. The encryption module block is flanked on two sides by the Read/Write Buffer (RWB) and Error Correction Coding (ECC) block. It follows that there must be input and output data buses to each of these blocks, along with the handshaking signals. Dataflow can be stalled by either Ack or Req going low, so to know that a datapath operation is incomplete, a sector frame signal is used to bracket the entire transaction. The sector address consists of address bit 9 and upwards. A four bit address runs in the opposite direction and is used to select a buffer bank within the RWB. The architecture consists of dedicated combinational logic for a round of encryption and a round of decryption. Their contents are similar in size and function, but they are inverses. A round_companion module accepts plaintext input and works with either Round or InvRound iteratively to produce a result, which is latched in the mux block and is accessible in either peripheral or datapath mode.

FIG. 5 is a table showing address offsets in the processor 18 for the various register fields and registers utilized in the 128-bit AES encryption process used in the preferred embodiment of the invention. These address offsets are included in the AES base address (AES_BASE) in the host processor Configuration Registers Memory. The register fields and registers are respectively defined in FIGS. 6 to 11.

The EEPROM control block 170 implements encryption key management. It interfaces with an integrated EEPROM 180 through EEPROM state machine 210 to store and maintain all keys and passwords; and interfaces with the configuration bus through Key Manager state machine 212 for supplying passwords, key seeds and commands, and to read status. The interface to the EEPROM allocates space for the storage of a plurality of sets of keys and passwords, four in the embodiment illustrated, as defined by the SEC control register bit mnemonic KEY_SELECT[1:0] (bit #4:3 in FIG. 16). The Password Compare block 214 authenticates supplied passwords. The Key Compare block 216 verifies written keys. The XOR blocks provide key generation from a supplied key seed, the current key, and the current password. All operations are under commands to the Key Manager state machine 212.

Figure 12:
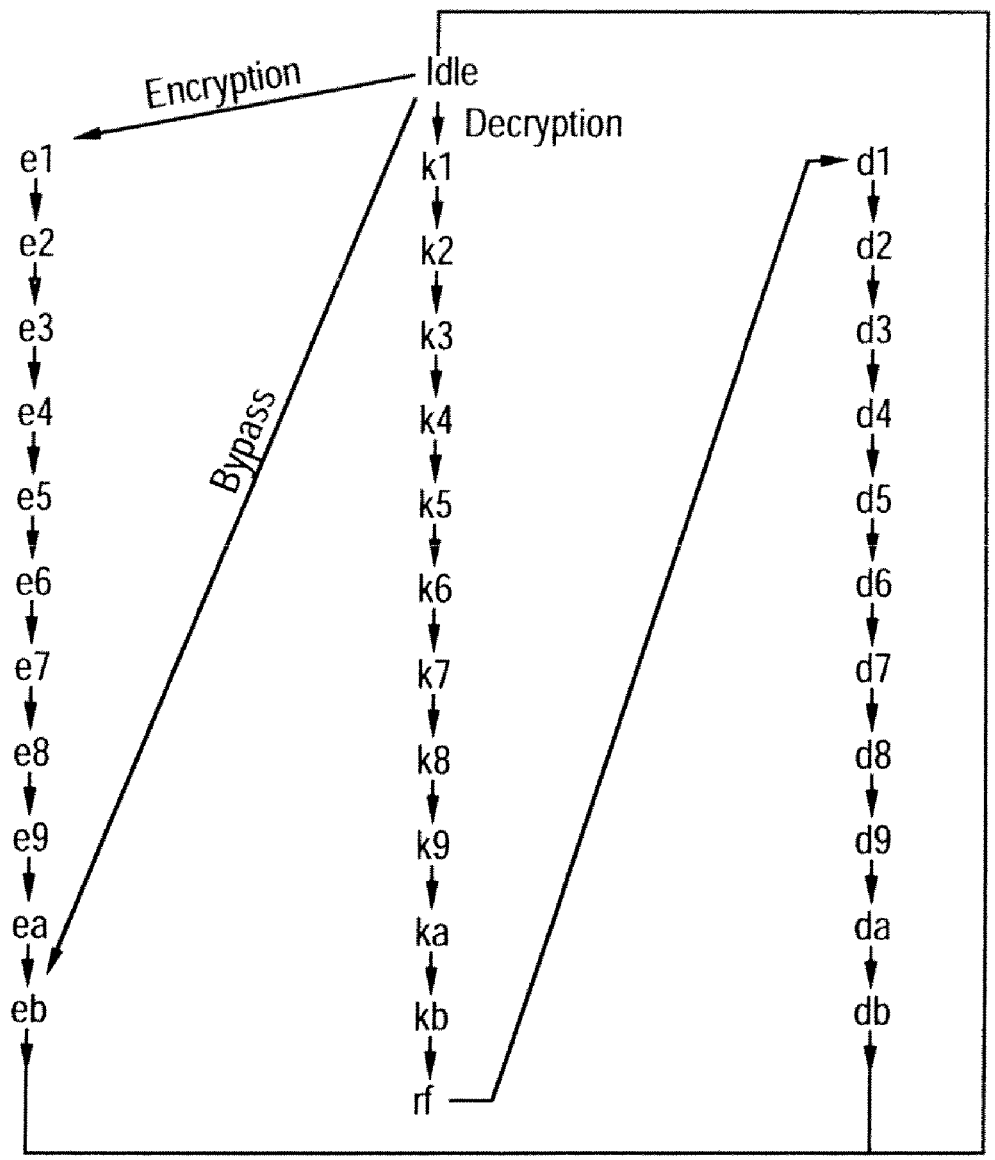
FIG. 12 is a State Diagram showing encryption and decryption timing in the encryption module of FIG. 4.

FIG. 12 is a state diagram showing encryption and decryption timing in the encryption module. As illustrated in FIG. 12, encryption to NAND takes 11 clocks while decryption takes 23 clocks. The discrepancy arises because the key is expanded to 11 subkeys and the order in which they are generated matches the requirement for them during encryption, but is in the opposite order to the sequence needed for decryption. This means they must be pre-expanded into a dual-port register file, taking 11 clocks. The register file's output is clocked so there is a clock cycle handoff time between the end of writing and the start of reading. Total decryption time is 11 clocks for expansion plus 1 clock handoff, and finally 11 clocks for actual decryption.

PseudoCode for the Encryption Module Peripheral Mode is as follows:

```
define false = 0x0;
define Manual = 0b1; // Manual ENCRYPTION MODULE launch
define Auto = 0b0; // Auto ENCRYPTION MODULE launch
define le__not__be = 0b10; // If the processor splits a word write into two
    halfword writes, with le__not__be
// set the halfword write to the upper address (vs. lower address) will
    be the one
// that causes launch. Make your choice such that this is the last write.
define d__not__e = 0b100; // decryption.
define peri__enable = 0b1000; // Enable the clock while you use the
    ENCRYPTION MODULE or expect nothing.
define key = 0x000102030405060708090a0b0c0d0e0f;
define plain = 0x00112233445566778899aabbccddeeff;
define cipher = 0x69c4e0d86a7b0430d8cdb78070b4c55a;
// <>< Manual Launch ><>
Configure_encryption module__control__reg(Manual | le__not__be |
    d__not__e | peri__enable, ENCRYPTION MODULEbase+0x18);
Load__encryption module__plain__reg(cipher, ENCRYPTION
    MODULEbase+0x0); // ENCRYPTION MODULE input data
    (encryption or decryption) always goes in the
// plain register
Load__encryption module__key__reg(key, ENCRYPTION
    MODULEbase+0x10);
Launch__manual(ENCRYPTION MODULEbase+0x1a);
while (get__status(ENCRYPTION
    MODULEbase+0x19)&0x4)==false);
plain = retrieve__cipher(ENCRYPTION MODULEbase+0x8);
// <>< Auto Launch ><>
Configure_encryption module__control__reg(Auto| le__not__be |
    d__not__e | peri__enable, ENCRYPTION MODULEbase+0x18);
Load__encryption module__key__reg(key, ENCRYPTION
    MODULEbase+0x10);
Load__encryption module__plain__reg(cipher, ENCRYPTION
    MODULEbase+0x0); // eighth halfword write causes encryption
    module to launch.
while (get__status(ENCRYPTION
    MODULEbase+0x19)&0x4)==false);
plain = retrieve__cipher(ENCRYPTION MODULEbase+0x8);
```

The user is able to access the Serial EEPROM Controller module 170 through the configuration bus interface, as shown in FIG. 3. The configuration bus is controllable from the microprocessor controller unit (MCU), and from the JTAG interface. When the JTAG interface is used, the ENTER_DEBUG command is permitted, and changing of DIS_ENCRYPT in SEC_CTRL is prohibited.

The following key commands can be executed in the operation of the Serial EEPROM Controller 170 described above:

The GET_KEY command is issued when CMD[2:0]="000" is written to the SEC-CTRL register. This command retrieves the current key and password set from the EEPROM 180. The key and password set is determined by KEY_SELECT[1:0] found in the SEC-CTRL register.

The COMPARE_KEYS command is issued when CMD [2:0]="001" is written to the SEC-CTRL register. This command provides the results of two comparisons. It compares the current password with the test password, and it compared the current key with the previously written key. The results are provided in the SEC-STATUS register.

The ADD_KEY command is issued when CMD[2:0]="010" is written to the SEC-CTRL register. This command forms the new key from the current password, current key, and the software supplied key seed. This new key can be used in the data copy operations. The new password is also supplied by software and will come into effect when the UPDATE command is executed. The current key and current password are retrieved with the GET_KEY command.

The REMOVE_KEY command is issued when CMD [2:0]="011" is written to the SEC-CTRL register. This command transitions to the Remove key state where the data copy can be completed.

The CHANGE_KEY command is issued when CMD [2:0]="100" is written to the SEC-CTRL register. This command forms the new key from the current password, current key, and the software supplied key seed. This new key can be used in the data copy operations. The new password is also supplied by software and will come into effect when the UPDATE command is executed. The current key and current password are retrieved with the GET_KEY command. Reading the SEC_STATUS register provides the current key state status.

The UPDATE_KEY command is issued when CMD [2:0]="101" is written to the SEC-CTRL register. The generated key and password are written into EEPROM 180 at the KEY_SELECT location.

The following states are possible in the operation of the Serial EEPROM Controller (SEC) block 170 described above:

Insecure State: The device is powered up in the Insecure state. In this state, a password in not required, and a key is not used to read and write data to NAND flash.

Get Key: This state is entered with the Get_Key command. The current password and key set is read from the EEPROM 180. If successful, the current key and current password are updated and control is transferred to the key loaded state. Control will be transferred back to the Insecure state if the EEPROM 180 is busy writing, or if an error is encountered.

Key Loaded: This state is entered upon the successful read of the key and password from the EEPROM 180. A key comparison can be made by loading the compare keys commands, or a new key can be created by loading the add key command.

Compare: In this state, the current password is compared with the test password, and the current key is compared with the key written. Results are available upon completion. If the passwords match, control will be transferred to the Secure state. If the passwords did not match, control will be transferred back to the Insecure state.

Add Key: In this state, software can read in unencrypted data and write back using the newly generated encryption key. Since reading is done in bypass mode, all previously stored encrypted data is lost. Once the data copy operation is complete, the UPDATE_KEY command is used to write the new key and password to the EEPROM 180. The Insecure state is entered on completion.

Remove Key: The REMOVE_KEY command allows software to read encrypted data with the current key, and to write data back with no key. Once the data transfer is complete, the UPDATE_KEY command is executed to write the new key into EEPROM 180.

Change Key: The CHANGE_KEY command allows software to read encrypted data with the current key, and to write data back with the new key. Once the data transfer is complete, the UPDATE_KEY command is executed to write the new key into EEPROM 180.

Update Key: This state is entered with the Update command. The new password and newly form key are written to the EEPROM 180. On completion, control is transferred to the Insecure state.

Secure: In the Secure state, encrypted data is written to and read from NAND flash using the current key. In this mode, the COMPARE command must be executed. If the passwords match, the Validate state will be entered. If the passwords do not match, the Insecure state is entered.

Compare2: This state is entered from the Secure state. In this state, the current password is compared with the test password, and the current key is compared with the key written. Results are available upon completion. If the passwords match, control will be transferred to the Validate state. If the passwords did not match, control will be transferred back to the Insecure state.

Validate: This state ensures that a valid password is present prior to allowing the change of a key, the removal of a key, or the debugging with keys.

Secure Debug: This state asserts the DEBUG_EN signal, allowing the memory controller interface's debug functions with the encryption module operational. Executing the EXIT_DEBUG command will transition control to the Insecure state.

EEPROM testing is accommodated with the use of the current key, the key written, and the key compare block. A key can be generated and written into the EEPROM 180. This key can be read out and compared with the key written using the COMPARE command and monitoring using the KEY_STATUS[1:0] found in the SEC-STATUS register. New keys can be formulated by modifying the key seed. Bits can be inverted by seeding a bit position with a logic 1. At no time is the actual key known by software; only the comparison results.

Figure 13:
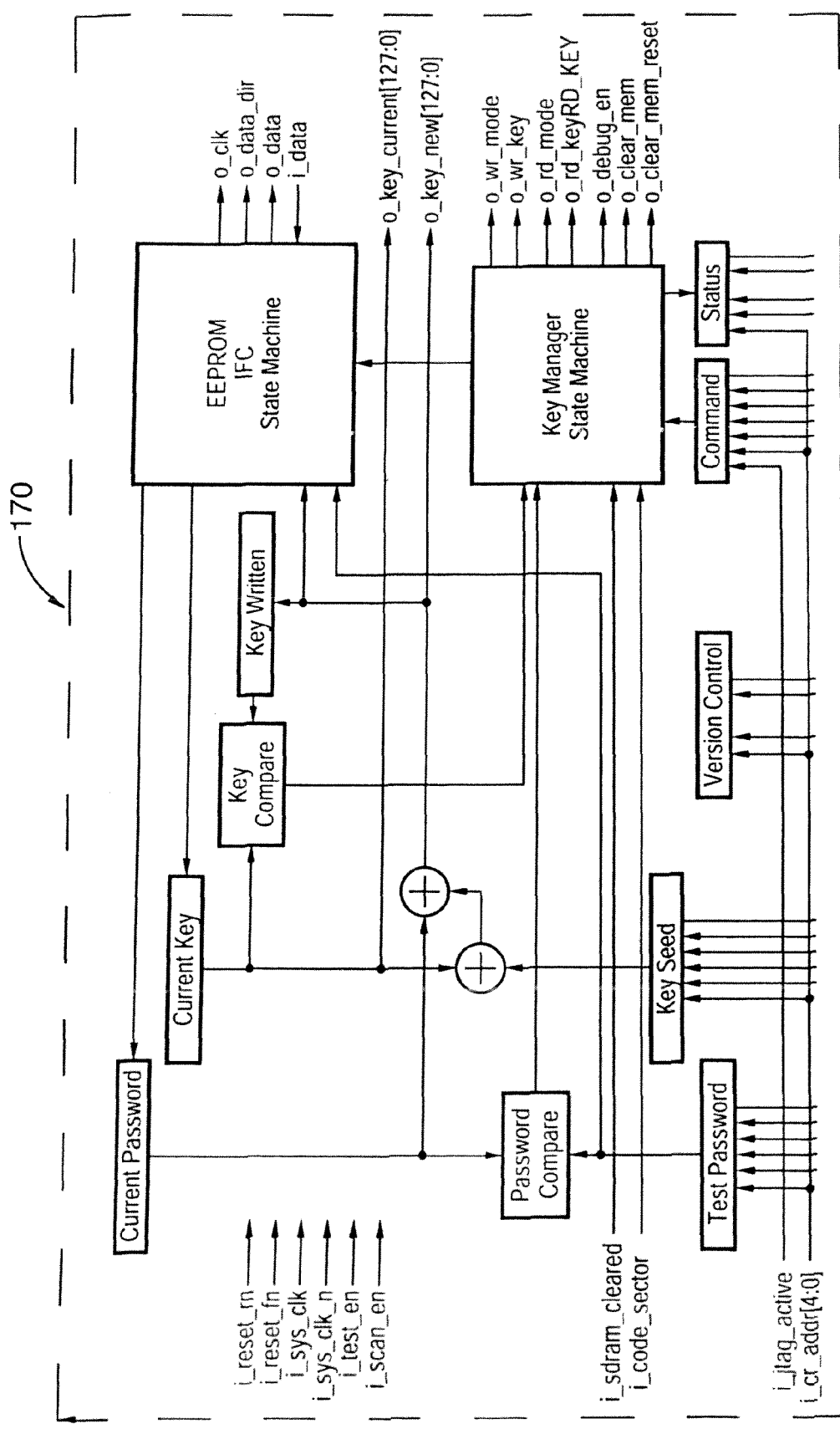
FIG. 13 is a block diagram of the Serial EEPROM Controller in the memory controller interface of FIG. 3.
Figure 14:
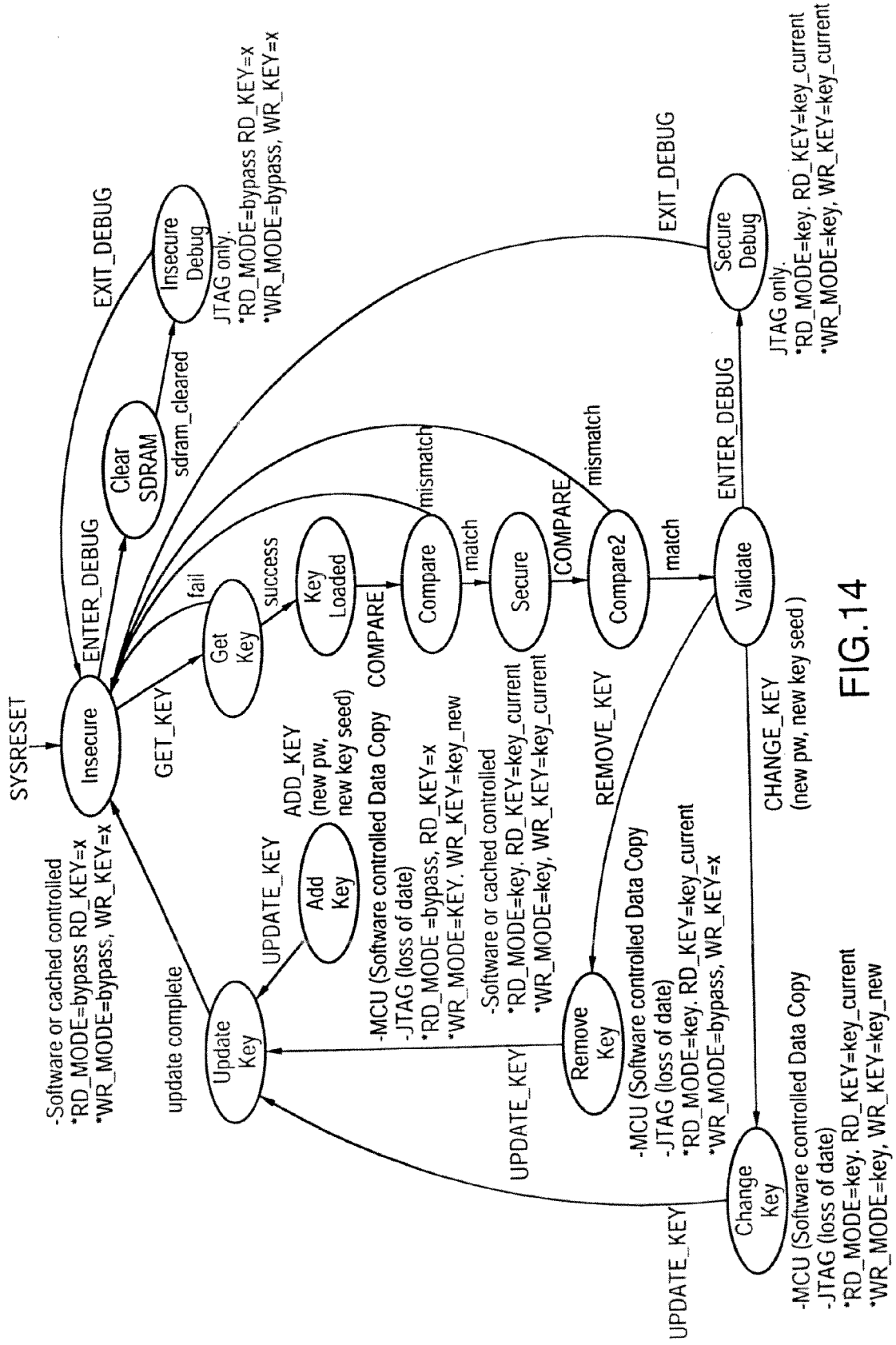
FIG. 14 is a state diagram for the Serial EEPROM Controller of FIG. 13.

FIGS. 16A and 16B show the Control Register table for the Serial EEPROM Controller 170 of FIG. 13. The KEY_SELECT function allows for up to four password/key combinations. FIG. 14 shows the generation of a new password and new key along with redundant passwords and keys. To generate a new password and a new key, steps (a), (b), and (c) are performed As follows: (a) Starting from the Insecure state, software uses the GET_KEY command, along with a specified KEY as determined by KEY_SELECT, to initialize the current password and the current key from the specified password/key slot in EEPROM 180. At the end of this task, the state machine passes through the Get_Key state and arrives at the Key_Loaded state. (b) While in the Key_Loaded state, software provides a new password (SEC_PW) and a new key_seed (SEC_KS) and then executes the ADD_KEY command to generate a new encryption key. The state machine then arrives in the Add_Key state, where the data copy function (if required) can be executed by software. (c) Once software has completed the data copy function in the Add_Key state, software can then execute the Update command specifying with KEY_SELECT, the location in EEPROM 180 to store the new password and new encryption key. The state machine passes through the Update_Key state and arrives back in the Insecure state.

To create a redundant copy of the newly created password and encryption key, where the software is configured to do so (for example by enabling a command for same), after creating the newly created password and encryption key the software performs the same sequence of events, (a), (b), and (c), specifying a different EEPROM location in step (c) from the key slots assigned by KEY_SELECT[1:0] (bit #4:3 in FIG. 16). Namely, the GET_KEY command would be used to initialize the current password and the current key from the same EEPROM slot as in (a) as specified by KEY_SELECT. While in the Key_Loaded state, software would provide the same new password (SEC_PW) and same key seed (SEC_KS) as provided in (b). In the Add_Key state, software would specify a different EEPROM location than that specified in (c) by configuring KEY_SELECT with a different redundant slot and executing the UPDATE_KEY command.

If the system software detects that the current key may be corrupted, a redundant current key and current password are automatically retrieved from one of the other key slots in EEPROM 180 using the GET_KEY command. Software is able to detect a corrupted encryption key by detecting a faulty data signature that could be placed in the data, or by the detection of faulty java script execution. The GET_KEY command is issued when the software automatically writes CMD[2:0]="000" to the SEC control register, to retrieve the current key and password set. The key and password set is determined by KEY_SELECT[1:0] found in the SEC control register (FIG. 16). All passwords and keys are stored in EEPROM 180, and optionally the software can be programmed to attempt to overwrite the faulty location.

The extra key slots in EEPROM 180 could also be used for different purposes; for example, a primary password/key can be stored for decryption of private system data; a third party software application password/key can be stored in another location for suppliers that want to keep data (e.g. JAVA scripts) confidential while at the same time allowing users execute the script; a separate user-selected data password/key for emails, appointments, etc. can be stored in a third location; and any other password/key that may be useful or desirable in any particular situation can be stored in a fourth location. In this embodiment the location of each particular key is mapped and the key-password set invoked by the software when the data associated with the particular key is presented to the EEPROM control block 170. The system and method of the invention thus provides the additional advantage of allowing for different levels of encryption for different sets of data on a data processing device 10.

Various embodiments of the system having been thus described in detail by way of example, it will be apparent to those skilled in the art that variations and modifications may be made without departing from the invention.

I claim:

1. A data processing device, comprising:
   an encryption device for encrypting and decrypting data using an encryption key;
   a key generating device adapted to generate a first encryption key associated with a first password using the first password, a first key seed, and a current key, and to generate a second encryption key associated with a second password, wherein the first encryption key is used to encrypt or decrypt a first set of data, and wherein the second encryption key is used to encrypt or decrypt a second set of data; and
   at least one memory adapted to store the first set of data and the second set of data.

2. The data processing device of claim 1, wherein the key generating device is further adapted to generate at least one redundant encryption key corresponding to the first encryption key by generating said at least one redundant encryption key from the first password, the first key seed, and the current key, and wherein one of the at least one redundant encryption key is used to encrypt or decrypt the first set of data upon occurrence of a particular event.

3. The data processing device of claim 2, wherein the particular event is selected from one of:
   a determination that the first encryption key may be corrupted;
   detection of a faulty data signature; or
   detection of a faulty javascript execution.

4. The data processing device of claim 1, wherein the key generating device is adapted to generate the second encryption key from the second password, a second key seed, and a current key.

5. The data processing device of claim 1, further comprising an EEPROM memory adapted to store the first encryption key and the second encryption key.

6. The data processing device of claim 5, wherein the key generating device is comprised in an EEPROM control block in communication with the EEPROM memory.

7. The data processing device of claim 1, wherein each of the first and second encryption keys is associated with a different type of data.

8. The data processing device of claim 1, wherein the first set of data comprises one of private system data, data associated with a software application, email data, or appointment data, and the second set of data comprises a different one of private system data, data associated with a software application, email data, or appointment data.

9. The data processing device of claim 1, wherein the data processing device is comprised in a mobile communication device.

10. A data processing device, comprising:
    means adapted to encrypt and decrypt data using an encryption key;
    means adapted to generate a first encryption key for a first set of data, the first encryption key being associated with a first password and being generated from the first password, a first key seed, and a current key, and to generate a second encryption key for a second set of data, the second encryption key being associated with a second password and being generated from the second password, a second key seed, and the current key; and
    means adapted to store the first encryption key and the associated first password, the second encryption key and the second associated password, the first set of data, and the second set of data.

11. The data processing device of claim 10, further comprising means adapted to generate at least one redundant encryption key corresponding to the first encryption key by generating said at least one redundant encryption key from the first password, the first key seed, and the current key, wherein one of the at least one redundant encryption key is used to encrypt or decrypt the first set of data upon occurrence of a particular event.

12. The data processing device of claim 11, wherein the particular event is selected from one of:
    a determination that the first encryption key may be corrupted;
    detection of a faulty data signature; or
    detection of a faulty javascript execution.

13. The data processing device of claim 10, wherein each of the first and second encryption keys is associated with a different type of data.

14. The data processing device of claim 10, wherein the first set of data comprises one of private system data, data associated with a software application, email data, or appointment data, and the second set of data comprises a different one of private system data, data associated with a software application, email data, or appointment data.

* * * * *